US012641083B2

(12) United States Patent
Moss et al.

(10) Patent No.: US 12,641,083 B2
(45) Date of Patent: May 26, 2026

(54) DYNAMIC ALIGNMENT OF DEFINITIONS FOR ENTITLEMENT MANAGEMENT AND CONTROL

(71) Applicant: Bank of America Corporation, Charlotte, NC (US)

(72) Inventors: Susan Moss, Vestal, NY (US); Malinda Kieffer, Chillicothe, MO (US); Tanya Wilson, Newark, DE (US); Andrzej Grabski, Glen Rock, NJ (US); Donna Phillips, Newark, DE (US); Kiran Boosetty, Jacksonville, FL (US); Robert R. Rosseland, Charlotte, NC (US); Ravinder Sodhi, Plano, TX (US); Gerard Gay, Seattle, WA (US); Rahul Mishra, Pennington, NJ (US); Samuel M. Moiyallah, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 443 days.

(21) Appl. No.: 18/234,495

(22) Filed: Aug. 16, 2023

(65) Prior Publication Data

US 2025/0063046 A1     Feb. 20, 2025

(51) Int. Cl.
*H04L 29/06*          (2006.01)
*H04L 9/40*           (2022.01)

(52) U.S. Cl.
CPC .................................... *H04L 63/10* (2013.01)

(58) Field of Classification Search
CPC ....... H04L 63/10; H04L 67/306; H04L 5/023; H04L 9/088; H04L 2012/5603; H04L 2012/6424; G03G 15/5091; G05B 2219/32153; G06F 3/1238; G06F 9/4451; G06F 3/0622; G06F 9/468; G06F 16/9574; G06F 21/62; G06F 2221/2141; G06Q 30/0269; G10H 2240/105; H04M 15/8235; H04M 2215/784; H04N 1/4406;

(Continued)

(56) References Cited

U.S. PATENT DOCUMENTS

2008/0027860 A1 * 1/2008 Mullen .................. G06Q 20/40
                                                        705/39
2013/0019237 A1 * 1/2013 Pardehpoosh ..... G06Q 30/0609
                                                        717/176

* cited by examiner

*Primary Examiner* — Edward Zee
*Assistant Examiner* — Leynna Truvan
(74) *Attorney, Agent, or Firm* — Weiss & Arons LLP

(57)                    ABSTRACT

An artificially intelligent system for selection of user entitlements may be provided. The system may include a receiver that receives data elements. The system may include an artificially intelligent engine. The artificially intelligent engine may receive the data elements from the receiver and process and/or manipulate the data elements. The processing and/or manipulating the data elements may include identifying ownership data of hardware, identifying ownership data of software entitlements based on the identified ownership data of the hardware, identifying groups of users and group-based access to the current set of entitlements and previous sets of entitlements, mapping the group-based access based on the groups of users and group-based access findings, identifying the user's level of access to the current set and previous sets of entitlements, using the data elements to generate a description for each entitlement in an entitlement subset and generating a selectable template for the user's future entitlements.

10 Claims, 4 Drawing Sheets

(58) Field of Classification Search
CPC ...... H04N 21/4181; H04N 2201/3246; H04W
12/08; H04W 48/00; H04W 48/16
See application file for complete search history.

ACCESS REVIEW FOR USER 123

CURRENT ACCESS:

For additional data, Select:
☒ Application Details
☒ Platform Details
☒ Entitlement Details
☒ Additional pop-up window details

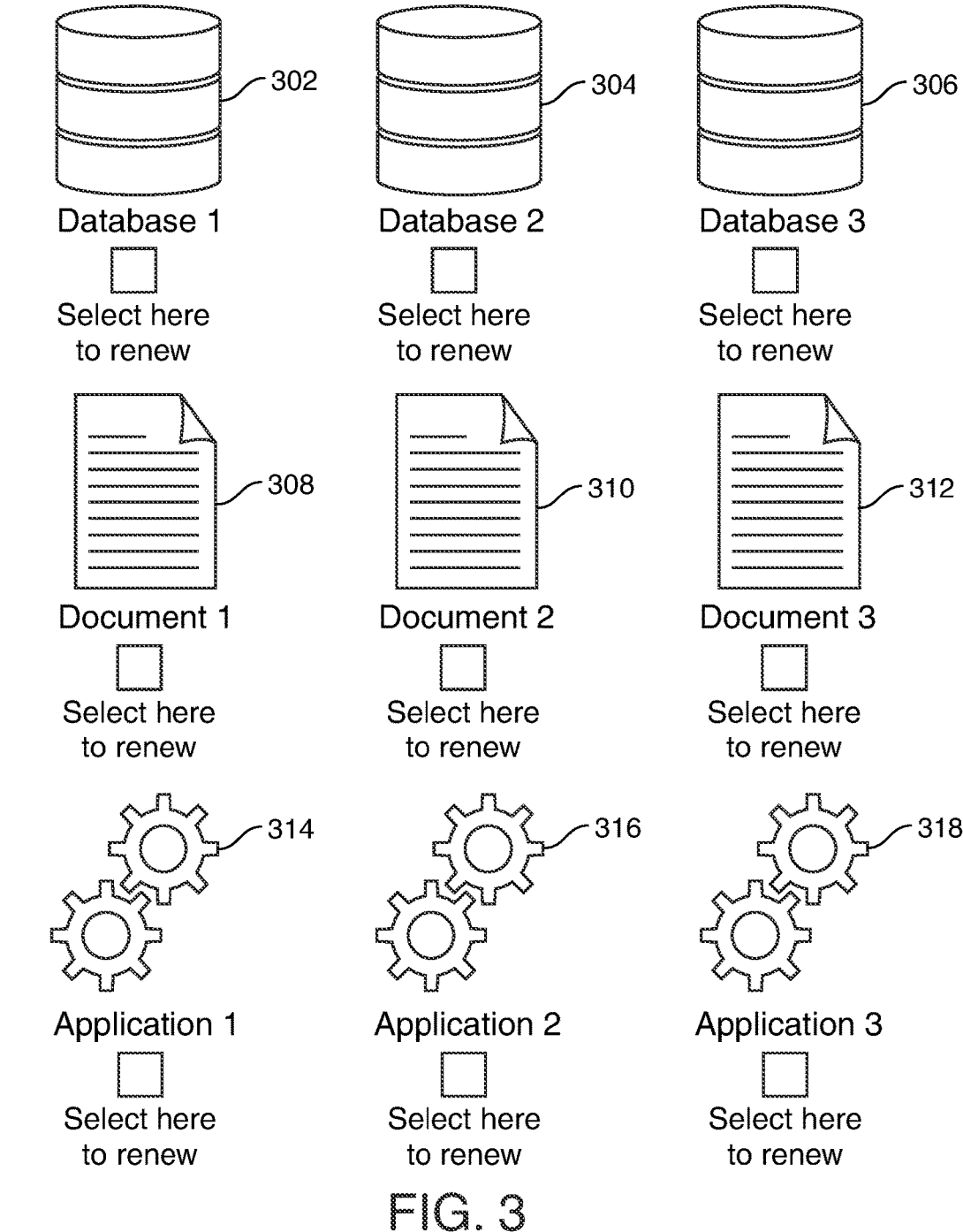

Database 1 — 302
☐
Select here
to renew

Database 2 — 304
☐
Select here
to renew

Database 3 — 306
☐
Select here
to renew

Document 1 — 308
☐
Select here
to renew

Document 2 — 310
☐
Select here
to renew

Document 3 — 312
☐
Select here
to renew

Application 1 — 314
☐
Select here
to renew

Application 2 — 316
☐
Select here
to renew

Application 3 — 318
☐
Select here
to renew

FIG. 3

⊞ ⊟     ⊞ CORP     ⊞ CTI_App_Support    ⓘ

— 402

Application Details — 404

Application Details for CTI_App_Support

| | |
|---|---|
| Description | Not Available |
| Application Owner/Manager: | Not Applicable |
| Has Social Security number (SSN) or any portion of SSN: | Not Applicable |
| Has Process or Transmit credit or debit card number: | Not Applicable |
| Stores Material Non-Public Information (MNPI): | Not Applicable |
| Has Tax Identification Number (TIN) or any portion of a TIN: | Not Applicable |
| Application Access Admin/Contact: | Not Available |

Platform Details — 406

Platform Details for CORP

Description: Active Directory
Category:   Wide Area Network
            (WAN)

Entitlement Details — 408

Entitlement Details for CTI_App_Support

| | |
|---|---|
| ⓘ Description: | Legacy access group, used by CTI Third-party support. Leave in place. |
| *Former Entitlement Name:* | Telecom_App_Sup |
| ⚝ Privileged Access: | NOT SPECIFIED |
| Ⓢ Segregation of Duties (SoD): | This entitlement does not have a Segregation of Duties (SoD) violation indicator. |

Additional details pop-up window:

— 410

This entitlement allows the user to access CTI (Computer Telephony Integration) Support Tools to research production interactive voice response (IVR) issues impacting our customers and/or contact centers. This access should be used by support teams. There is no NPI (Non-Public Information) data in this tool. There are no segregation of duties concerns. This application owner is Jane Doe. The application access contact is John Smith.

FIG. 4

DYNAMIC ALIGNMENT OF DEFINITIONS FOR ENTITLEMENT MANAGEMENT AND CONTROL

FIELD OF TECHNOLOGY

Aspects of the disclosure relate to defining software and hardware resources in a complex enterprise computing environment.

BACKGROUND OF THE DISCLOSURE

Large enterprise organizations may provide their personnel (hereinafter, "user(s)") with access to various software and hardware resources. These resources may be remotely accessible to users over a network. Illustrative software resources may include database access, word processing, email applications, video conferencing and other software. Illustrative hardware resources may include access to servers and cloud computing environments. Each of these hardware and/or software resources may be referred to herein as an "entitlement."

Large enterprise organizations may have over 750,000 users each having different access permissions and rights to over 4,000 different entitlements. Each user may have their own credentials for accessing an entitlement. To prevent unauthorized access to an entitlement, a user's credentials may automatically expire if the user does not access a resource within a pre-determined time window. Management of user credentials and associated expiry of those credentials for all a user's entitlements may be managed by an access rights management ("ARM") computer server.

Automated expiration of user credentials may not pose a technical challenge for entitlements a user accesses on a regular basis. For example, as part of their regular duties, a user may access a specific entitlement multiple times on a daily or weekly basis. Daily or weekly access to the entitlement may be sufficiently frequent to prevent the ARM server from automatically expiring the user's credentials.

However, in large organizations, users may also have credentials that allow a user to access an entitlement on behalf of one or more colleagues in a secondary or proxy role. For example, a first user may supervise a second user. Both the first and second user may have access credentials to a target entitlement. However, the second user may log on more frequently to the target entitlement than the first user. It is possible for access credentials of the first user to expire despite collaborating and supervising the second user. Thus, if the second user is not available to access the target entitlement, the first user may not be able to access the target entitlement during an ongoing project.

Currently, a user must manually monitor the status of each of their access credentials. The user must calendar reminders to ensure that they periodically access an entitlement and maintain active credentials. Users that access multiple entitlements may need to spend an hour or more a month simply logging in to multiple entitlements to ensure their credentials remain active.

Additionally, expiration of credentials may be tracked and controlled by the ARM server. In some scenarios, despite a user regularly logging in to an entitlement, the ARM server may not be synchronized or updated to reflect the user's regular login activity. Thus, despite tracking and duly logging in to a target entitlement, the user's credentials may nonetheless expire. Additionally, the user may not even be aware that their credentials have expired.

The technical challenges of managing credentials for multiple users are exponentially compounded by the large number of users, software applications and computer servers in complex enterprise environments. It is technically challenging to manage the thousands of entitlements and access credentials in such complex enterprise environments. Software and hardware entitlements provide functionality that allow users to efficiently perform tasks needed by the enterprise organization. Therefore, it is important that users have consistent access to entitlements they need to perform their daily tasks.

However, it is also important for security protocols that prevent unauthorized access to those entitlements remain in place. Allowing user to maintain unnecessary access to an entitlement may expose the enterprise organization to an increased risk of a cyberattack on its information systems or other resources. Users who have unnecessary access to entitlements may not be aware that a rarely used entitlement is malfunctioning or behaving erratically. Rarely used entitlements may not be configured appropriately or may not be updated or patched regularly. Additionally, extraneous access credentials create additional exposure points that may be utilized by malicious hackers or other unscrupulous actors.

It would be desirable to apply more efficient and consistent automated tools for managing and controlling access to entitlements in complex enterprise environments. As described herein, dynamic alignment of definitions for entitlement management and control provides technical solutions for improving the consistency and reliability of access to software and hardware resources in complex enterprise environments.

SUMMARY OF THE DISCLOSURE

Apparatus, methods and systems for dynamic alignment of definitions for entitlement management and control are provided.

Such a dynamic alignment of definitions for entitlement management and control system may provide users of entitlements with periodic access reviews. Access reviews may request from a user to decision whether continued access to each entitlement is required by the user. Because the user actively requested access to a specific entitlement, an access review may replace continued logins to an entitlement.

At times, an access review may be unclear. For example, it may not be clear which entitlement, named within an access review, is linked to which in-use entitlement. An access review may be sent to an employee within an entity. In the event that the employee is unable to identify one or more of the entitlements, the employee may not request renewed access for the entitlement. Although the employee may not have requested renewed access for the entitlement, the employee may have recently used the entitlement. To reiterate, although the employee may have recently used an entitlement, such as a document or a database, the employee may be unaware either of how and/or when the document and/or the database was accessed. This may pose a problem to the employee because the employee may deny access for the entitlement and then attempt to use the document shortly afterward. As such, the employee may be denied access to the entitlement. The employee may be required to re-request access in order to access the entitlement. The employee may be required to wait for access to the entitlement. The employee may also be given a new set of credentials to access the entitlement. The wait time as well as adapting to the new set of credentials data may be frustrating to the employee.

Therefore, a dynamic alignment of definitions for entitlements management for a control system may add more background data and/or information to each entitlement. Although additional information may be available in multiple data silos, such a system may use machine learning to dynamically retrieve all of the information from the disparate sources, process the retrieved data using a rules-based system and make the processed data available within a single location. The single location may be made available to users as a real-time, interactive portal.

The dynamic alignment of definitions for entitlements management for a control system may include the real-time, interactive portal. The real-time, interactive portal may provide a user with the ability to perform an access review. The real-time, interactive portal may enable a user to obtain clear, up-to-date information regarding each of the entitlements provided within the access review. The information may include specialized information based on the user's current or previous roles. For example, the information may recommend one or more entitlements based on the user's occupation within the entity.

The portal may integrate with an interface that expires a user's credentials after unuse for a predetermined time period. This system may also be implemented as an access review tool ("ART") under access rights management ("ARM").

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows still another illustrative diagram in accordance with principles of the disclosure; and FIG. 4 shows yet another illustrative diagram in accordance with principles of the disclosure.

DETAILED DESCRIPTION OF THE DISCLOSURE

Figure 1:
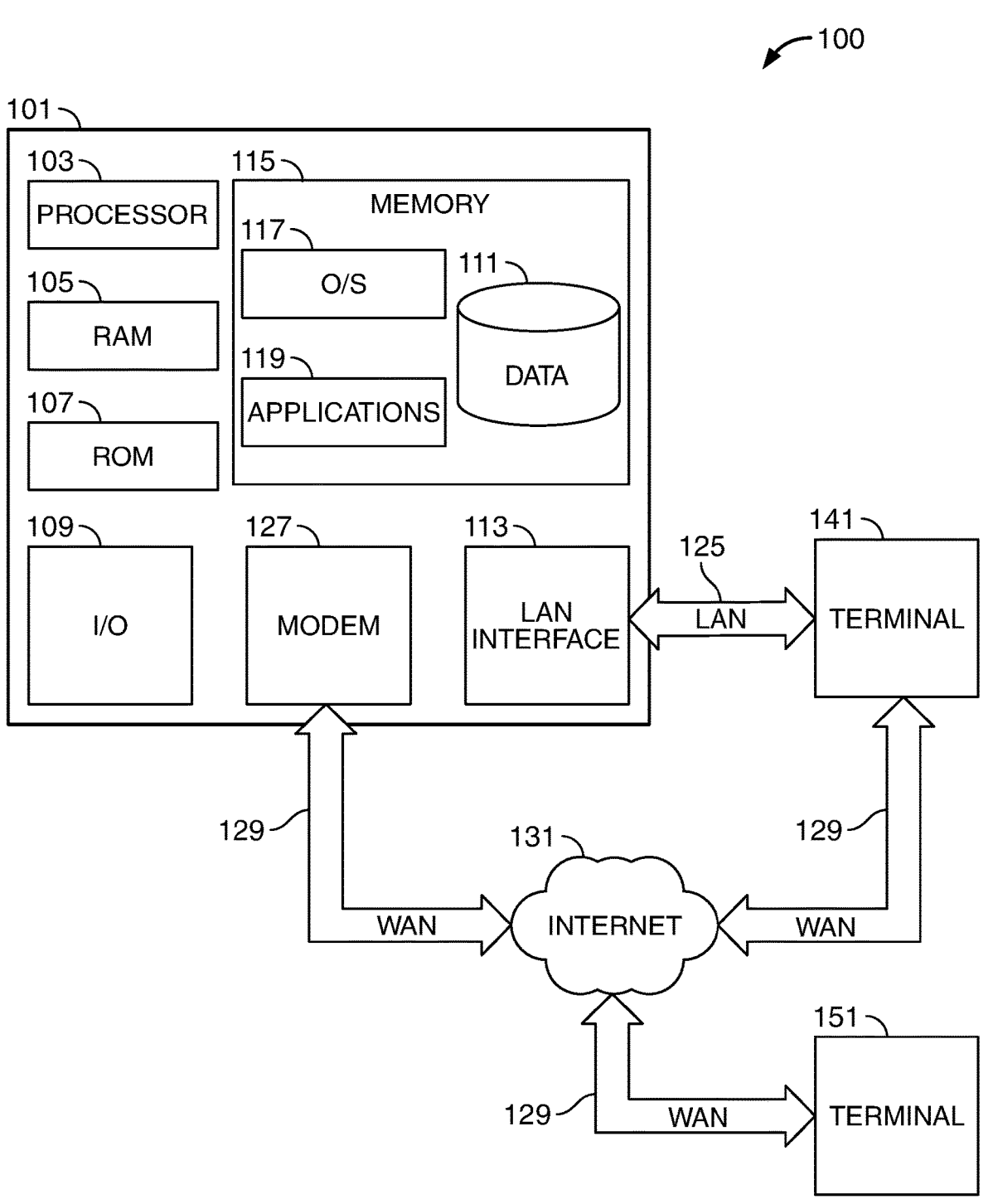
FIG. 1 shows an illustrative diagram in accordance with principles of the disclosure.

Apparatus, methods and systems for prediction of user entitlements and creating selectable templates for user entitlements are provided.

Methods may include a continuously updating profile generation and update phase. Methods may also include an entitlement renewal phase.

The continuously updating profile generation and update phase may include receiving an entitlement listing. The entitlement list may include a plurality of entitlements. The continuously updating profile generation and update phase may also include crawling a plurality of databases for a plurality of data elements relating to the plurality of entitlements. The continuously updating profile generation and update phase may also include inputting the plurality of data elements into an artificially intelligent engine. The continuously updating profile generation and update phase may also include creating, based on the inputted plurality of data elements, using the artificially intelligent engine, a profile for each entitlement. The profile may include a synopsis of the entitlement.

The data elements may include a current role related to the user. The data elements may also include one or more previous roles related to the user. A role may be understood to mean a position within an entity. Examples of a role may include a computer analyst, a project manager, a secretary, an executive or any other suitable role. Because a user may change roles within an entity, and a user may utilize different entitlements in each role, information relating to previous roles and current roles may be used to identify the entitlement needs of a user. Furthermore, at times, although a user may not be active in a specific role, because the user previously had access to specific entitlements, the user may be in the habit of using the specific entitlements and therefore may continue using those entitlements.

The data elements may also include a current set of entitlements to which the user currently has access. The data elements may also include details of the current set of entitlements. The data elements may also include one or more previous sets of entitlements to which the user previously had access. The data elements may also include details of the previous sets of entitlements.

The details of each of the current set of entitlements and/or each of the one or more previous sets of entitlements may include entitlement names included in the current set of entitlements and the previous set of entitlements. The details of each of the current set of entitlements and/or each of the one or more previous sets of entitlements may include one or more profiles of a majority of accessors to the entitlement. The details of each of the current set of entitlements and/or each of the one or more previous sets of entitlements may include one or more systems and/or databases with which the entitlement directly or indirectly communicates. The details of each of the current set of entitlements and/or each of the one or more previous sets of entitlements may include one or more data elements, systems or databases that the entitlement includes and/or commands. The details of each of the current set of entitlements and/or each of the one or more previous sets of entitlements may include one or more comments regarding the entitlement.

At times, ownership data relating to a hardware entitlement may be obtained in less than a predetermined amount of time. However, ownership data relating to a software entitlement may be obtained in greater than a predetermined amount of time. Furthermore, many times, ownership of a software entitlement may be obtained by determining ownership of a hardware entitlement on which the software entitlement is processed. Therefore, the data elements may also include ownership data relating to hardware associated with software entitlements. The software entitlements may be included in the current set of entitlements and/or the one or more previous sets of entitlements. As such, the data elements may include ownership data relating to software entitlements.

At times, prior to creating the profile for each entitlement, methods may include processing the data elements by the artificially intelligent engine. The processing may include identifying the ownership data of the hardware. The processing may also include identifying ownership data of software entitlements based on the identified ownership data of the hardware upon which the software entitlements are installed. The processing may also include identifying groups of users and group-based access to the current set of entitlements and the one or more previous sets of entitlements. The processing may include mapping the group-based access on the groups of users and group-based access findings. The processing may also include identifying the user's level of access to the current set of entitlements and/or to the one or more previous sets of entitlements. The identified level of access may be based on the user's historical access to the current set of entitlements and/or to the one or more previous sets of entitlements.

The entitlement renewal phase may include identifying, for a user, a subset of entitlements to which the user has access. The entitlement renewal phase may include presenting and/or displaying, to the user, the subset of entitlements. The presenting and/or displaying may be executed on a graphical user interface ("GUI").

The entitlement renewal phase may also include presenting and/or displaying, to the user, the profile for each entitlement included in the subset of entitlements. The entitlement renewal phase may also include enabling the user to select one or more entitlements for continued access. The entitlement renewal phase may also include receiving a selection of one or more entitlements from the user. The entitlement renewal phase may also include renewing the selected entitlements for the user. The entitlement renewal phase may also include disabling the unselected entitlements for the user.

In some embodiments, the entitlement renewal phase may include identifying, for a user, a first subset of entitlements to which the user has access. The entitlement renewal phase may also include identifying, for the user, a second subset of entitlements to which the user has greater than a threshold probability of requiring access. The first subset and/or the second subset may be identified by the artificially-intelligent engine. The first subset of entitlements and the second subset of entitlements may be presented to the user. The presentation may be via a GUI within a real-time, interactive portal. The profile for each entitlement, included in the first subset of entitlements and the second subset of entitlements, may be presented and/or displayed to the user. The user may be enabled to select, for continued access, one or more entitlements from the first subset of entitlements and the second subset of entitlements.

At times, entitlements that the artificially-intelligent engine has determined are essential for the user may be automatically reselected for the user. As such, the user may be unable to unselect such entitlements. Such entitlements may be displayed as grayed-out.

The entitlement renewal phase may also include enabling the user to give permission to a proxy user to access, on behalf of the user, one or more entitlements included in the selection of one or more entitlements. The entitlement renewal phase may also include enabling a proxy user to access, on behalf of the user, one or more entitlements included in the selection of one or more entitlements. The entitlement renewal phase may also include compelling the user to set a proxy user upon receipt, from the user, of an application for leave. The entitlement renewal phase may also include compelling the user to set a proxy user upon the user setting an out of office notification on one or more applications, such as a calendar or email communication.

Systems for prediction of user entitlements and creation of a selectable template for user entitlements may include one or more artificially intelligent systems. The artificially intelligent systems may include a receiver and an artificially intelligent engine.

The receiver may be operable to receive a plurality of data elements. The artificially-intelligent engine may be operable to receive the plurality of data elements from the receiver.

The artificially-intelligent engine may be able to process the data elements. Processing the data elements may include a plurality of steps. The steps may identify ownership data of hardware elements. The steps may identify ownership data of software entitlements based on the identified ownership data of the hardware elements upon which the software entitlements are installed, processed and/or executing. The steps may identify groups of users and group-based access to the current set of entitlements and one or more previous sets of entitlements. The steps may map the group-based access based on the groups of users and group-based access findings. The groups of users and group-based access findings may be identified by the artificially intelligent engine which may access historical information relating to the user's entitlements. The steps may identify the user's level of access to the current set of entitlements and/or to the one or more previous sets of entitlements based on the user's historical access to the current set of entitlements and/or to the one or more previous sets of entitlements. The steps may use the plurality of data elements to generate a description for each entitlement included in a subset of entitlements. The subset of entitlements may correspond to the user's future set of entitlements. The steps may generate a selectable template for the user's future set of entitlements.

At times, the artificially intelligent engine may manipulate the data elements by defining acronyms within an entitlement profile associated with each current entitlement and each of the one or more previous entitlements. Defining acronyms may clarify the entitlement and entitlement profile for the user. In order to define the acronyms, the artificially intelligent engine may retrieve, from one or more databases, the definition of each acronym.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented termination program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a artificial intelligence implemented termination program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more AI/ML algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
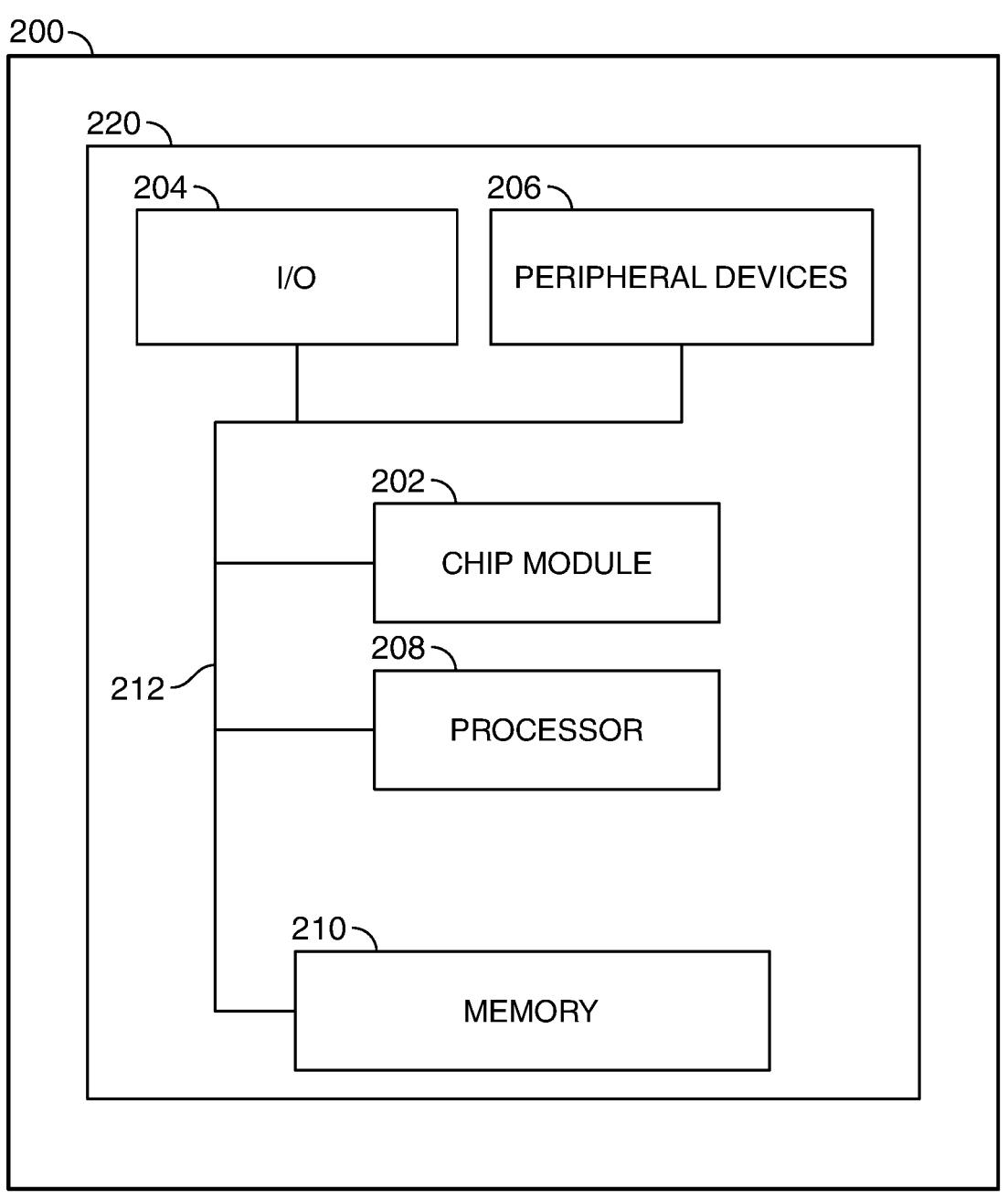
FIG. 2 shows another illustrative diagram in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-4. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

FIG. 3 shows an exemplary access review. The access review may be for exemplary user 123. Exemplary user 123 may perform a periodic access review. The periodic access review may occur on a cycle, such as weekly, monthly, annually or biannually.

The periodic access review may request, from the user, whether the user requires or requests continued access to one or more currently accessed entitlements. At times, the default view may be that each checkbox is selected. Other times, the default view may be that each checkbox is unselected. The user may select a checkbox (or maintain a selected checkbox) in order to renew access for the specified entitlement. The user may unselect (or maintain an unselected checkbox) in order to deny renewal of access for the specified entitlement.

The entitlements shown in the access review may include database 1, shown at 304, database 2, shown at 306, database 3, shown at 308, document 1, shown at 310, document 2, shown at 312, document 3, shown at 314, application 1, shown at 316, application 2, shown at 318 and application 3, shown at 320.

For each entitlement a user may be able to select additional data. The additional data available for selection may include application details, platform details, entitlement details and additional pop-up window details.

FIG. 4 shows another illustrative access review, as shown at 402. The illustrative access review may include an application entitlement. The application entitlement may be for an application named CTI_App_Support. CTI_App_Support may stand for Computer Telephony Integration Application Support. The access review may include retrieved data relating to the application. The retrieved data may enable the user to decision the entitlement.

The access review may include application details, shown at 404. Application details may include details of the application. The application details may include a description of the application, an application owner or manager, whether the application has a social security number ("SSN") or any portion of a social security number, whether the application has a process or transmit credit or debit card number, whether the application stores material non-public information ("MNPI"), whether the application has a tax identification number ("TIN") or any portion of a TIN and who is the application access administrator or contact administrator. The application details may include any other suitable details of the application.

The access review may also include platform details, shown at 406. Platform details may be details relating to the platform on which the entitlement is located. For example, there may be platform details for a platform named CORP. CORP may be an abbreviation for a corporate platform. The platform details may include a description of the platform. The description of the platform may be active directory. The category of the platform may include wide area network ("WAN").

The access review may also include entitlement details, shown at 408. The entitlement details, shown at 408, may include a description of the application. The description may be: Legacy access group, used by CTI Third-party support. Leave in place. The entitlement details may include a former entitlement name. The former entitlement name may be Telecom_App_Support. The entitlement details may include privileged access data. The privileged access data may not be specified. The entitlement details may include segregation of duties (SoD) may be that the entitlement does not have a Segregation of Duties (SoD) violation indicator.

The access review may include an additional details pop-up window, as shown at 410. The additional details may be viewable upon selection of an icon, such as a plus icon. The plus icon may be on top of the applications details 404. The additional details may be retrieved from various sources. A machine learning platform may be used to retrieve the additional details from the various sources. The additional details may enable a user to decision whether or not the user requires continued access to the entitlement. The additional details shown at 410 may include: This entitlement allows the user to access CTI (Computer Telephony Integration) Support Tools to research production IVR (Interactive Voice Response) issues impacting customers and or contact centers. This access should be used by support teams. There is no NPI (Non-Public Information) data in this tool. There are no segregation of duties concerns. The application owner is Jane Doe. The application access contact is John Smith.

Each of the application details, the platform details, the entitlement details and the additional pop-up window may enable the user to decision future access to each of the entitlements.

Thus, systems and methods for dynamic alignment of definitions for entitlement management and control are provided. Persons skilled in the art will appreciate that the present invention can be practiced by other than the described embodiments, which are presented for purposes of illustration rather than of limitation. The present invention is limited only by the claims that follow.

What is claimed is:

1. A method for creating a selectable template for user entitlements, the method comprising:

in a continuously updating profile generation and update phase:

receiving an entitlement listing comprising a plurality of entitlements;

crawling a plurality of databases for a plurality of data elements relating to the plurality of entitlements;

inputting the plurality of data elements into an artificially intelligent engine; and creating, based on the inputted plurality of data elements, using the artificially intelligent engine, a profile for each entitlement, the profile comprising a synopsis of the entitlement;

in an entitlement renewal phase:

identifying, for a user, a subset of entitlements to which the user has access;

presenting, to the user, the subset of entitlements;

presenting, to the user, the profile for each entitlement included in the subset of entitlements;

enabling the user to select one or more entitlements for continued access;

receiving a selection of one or more entitlements from the user;

renewing the selected entitlements for the user; and disabling the unselected entitlements for the user.

2. The method of claim 1 further comprising, in the entitlement renewal phase, enabling the user to give permission to a proxy user to access one or more entitlements included in the selection of one or more entitlements.

3. The method of claim 1 further comprising, in the entitlement renewal phase, enabling a proxy user to access one or more entitlements included in the selection of one or more entitlements on behalf of the user.

4. The method of claim 1 further comprising, in the entitlement renewal phase, compelling the user to set a proxy user upon receipt of an application for leave.

5. The method of claim 1 further comprising, in the entitlement renewal phase, compelling the user to set a proxy user upon receipt the user setting an out of office notification on one or more applications.

6. The method of claim 1 wherein the plurality of data elements comprises:

a current role related to a user;

a current set of entitlements and details of the current set of entitlements to which the user currently has access;

one or more previous roles related to the user;

one or more previous sets of entitlements and details of the previous sets of entitlements to which the user previously had access; and ownership data relating to hardware associated with software entitlements, the software entitlements included in the current set of entitlements and/or the one or more previous sets of entitlements.

7. The method of claim 6 further comprising, prior to creating the profile for each entitlement, processing the data elements by the artificially intelligent engine, the processing comprising:

identifying the ownership data of the hardware;

identifying ownership data of software entitlements based on the identified ownership data of the hardware upon which the software entitlements are installed;

identifying groups of users and group-based access to the current set of entitlements and the one or more previous sets of entitlements;

mapping the group-based access based on the groups of users and group-based access findings; and identifying the user's level of access to the current set of entitlements and/or to the one or more previous sets of entitlements based on the user's historical access to the current set of entitlements and/or to the one or more previous sets of entitlements.

8. A method for creating a selectable template for user entitlements, the method comprising:

in a continuously updating profile generation and update phase:

receiving an entitlement listing comprising a plurality of entitlements;

crawling a plurality of databases for a plurality of data elements relating to the plurality of entitlements;

inputting the plurality of data elements into an artificially intelligent engine; and creating, using an artificially intelligent engine, a profile for each entitlement, the profile comprising a synopsis for the entitlement;

in an entitlement renewal phase:

identifying, for a user, a first subset of entitlements to which the user has access;

identifying, for the user, a second subset of entitlements to which the user has greater than a threshold probability of requiring access;

presenting, to the user, the first subset of entitlements and second subset of entitlements;

presenting, to the user, the profile for each entitlement included in the first subset of entitlements and second subset of entitlements;

enabling the user to select one or more entitlements from the first subset of entitlements and from the second subset of entitlements for continued access;

receiving a selection of one or more entitlements from the user;

renewing the selected entitlements for the user; and disabling the unselected entitlements for the user.

9. The method of claim 8 wherein the plurality of data elements comprises:

a current role related to a user;

a current set of entitlements and details of the current set of entitlements to which the user currently has access;

one or more previous roles related to the user;

one or more previous sets of entitlements and details of the previous sets of entitlements to which the user previously had access; and ownership data relating to hardware associated with software entitlements, the software entitlements included in the current set of entitlements and/or the one or more previous sets of entitlements.

10. The method of claim 8 further comprising, prior to creating the profile for each entitlement, processing the data elements by the artificially intelligent engine, the processing comprising:

identifying the ownership data of the hardware;

identifying ownership data of software entitlements based on the identified ownership data of the hardware upon which the software entitlements are installed;

identifying groups of users and group-based access to the current set of entitlements and the one or more previous sets of entitlements;

mapping the group-based access based on the groups of users and group-based access findings; and identifying the user's level of access to the current set of entitlements and/or to the one or more previous sets of entitlements based on the user's historical access to the current set of entitlements and/or to the one or more previous sets of entitlements.

* * * * *